US012411895B1

(12) United States Patent
Pondicherry et al.

(10) Patent No.: US 12,411,895 B1
(45) Date of Patent: Sep. 9, 2025

(54) RULES FOR DATA QUALITY SUPPORT

(71) Applicant: Wells Fargo Bank, N.A., San Francisco, CA (US)

(72) Inventors: Prasad V. Pondicherry, Plano, TX (US); Ravinderjit Singh, Woodstock, MD (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/776,070

(22) Filed: Jul. 17, 2024

(51) Int. Cl.
*G06F 16/90* (2019.01)
*G06F 16/215* (2019.01)
*G06F 16/906* (2019.01)
*G06F 16/2455* (2019.01)

(52) U.S. Cl.
CPC ......... *G06F 16/906* (2019.01); *G06F 16/215* (2019.01); *G06F 16/24564* (2019.01)

(58) Field of Classification Search
CPC . G06F 16/215; G06F 16/24564; G06F 16/906
See application file for complete search history.

(56) References Cited

U.S. PATENT DOCUMENTS

| 7,711,660 | B1 | 5/2010 | Gentile et al. |
| 9,082,076 | B2 | 7/2015 | Miranda et al. |
| 9,262,451 | B1 | 2/2016 | Singh et al. |
| 9,519,862 | B2 | 12/2016 | Malka et al. |
| 10,185,728 | B2 | 1/2019 | Nath et al. |
| 10,331,635 | B2 | 6/2019 | Dani et al. |
| 10,409,802 | B2 | 9/2019 | Spitz et al. |
| 11,106,692 | B1 | 8/2021 | Guetta et al. |
| 11,249,710 | B2 * | 2/2022 | Li ........................... G06N 5/025 |
| 2014/0136958 | A1 | 5/2014 | Scattergood et al. |
| 2020/0242015 | A1 * | 7/2020 | Catt .................... G06F 11/3684 |
| 2022/0310267 | A1 * | 9/2022 | Cox ....................... G16H 50/20 |

OTHER PUBLICATIONS

Collibra, Data Intelligence Platform, Catch bad data before it catches you, https://www.collibra.com/us/en/products/data-quality-and-observability#sub-menu-features, Copyright 2024, pp. 1-10.

* cited by examiner

*Primary Examiner* — Diedra McQuitery
(74) *Attorney, Agent, or Firm* — Merchant & Gould P.C.

(57) ABSTRACT

An example computer system for executing data quality rules, the computer system comprising one or more processors; and non-transitory computer-readable storage media encoding instructions which, when executed by the one or more processors, causes the computer system to: receive a plurality of rules; group the plurality of rules into one or more categories of rules; determine a category of the one or more categories of rules to execute based on a scheduling trigger; request execution of each rule of the category by a database; and receive, from the database, output from execution of the each rule of the category.

16 Claims, 7 Drawing Sheets

RULES FOR DATA QUALITY SUPPORT

BACKGROUND

The amount of stored data has grown exponentially over the years. Many entities collect information about their customers, systems, and other analytics in the form of data. This data is stored in databases that are accessible later. Languages such as structured query language (SQL) can be used to manage and access this data. In addition, owners of the data may seek to analyze the large amounts of data to learn new characteristics about the entity from which the data originates, such as customers or account holders. For example, the data may indicate a customer behavior. However, collecting large amounts of data can lead to capturing low quality data that can negatively affect analysis and be difficult to manage.

SUMMARY

Examples provided herein are directed to managing data quality rules.

According to one aspect, a computer system for executing data quality rules comprises one or more processors; and non-transitory computer-readable storage media encoding instructions which, when executed by the one or more processors, causes the computer system to: receive a plurality of rules; group the plurality of rules into one or more categories of rules; determine a category of the one or more categories of rules to execute based on a scheduling trigger; request execution of each rule of the category by a database; and receive, from the database, output from execution of the each rule of the category.

According to another aspect, a method for executing data quality rules comprises receive a plurality of rules; group the plurality of rules into one or more categories of rules; determine a category of the one or more categories of rules to execute based on a scheduling trigger; request execution of each rule of the category by a database; and storing output from execution of each rule of the category.

The details of one or more techniques are set forth in the accompanying drawings and the description below. Other features, objects, and advantages of these techniques will be apparent from the description, drawings, and claims.

DETAILED DESCRIPTION

This disclosure relates to rules for supporting data quality. Collection of large amounts of data has led to acquiring low quality data. For example, certain data may include technical issues or have incorrect business logic. The examples provided herein manage the data repository within a database to properly address the low quality or incorrect data. The present disclosure provides embodiments that include data quality rules and support functions for managing data quality.

Data rules are defined to ensure data quality, consistency, and adherence to specific standards or requirements. They can be implemented as part of automated data pipelines or data governance frameworks. In one embodiment, some of the quality issues include technical errors that affect data analysis. For example, the data may normally require a binary value, but an entry has a "YES" or "NO" value instead of "1" or "0." Accordingly, data analysis cannot be completed since the entry has an incorrect value. The described concepts can be configured to create and manage rules that detect and/or correct these types of issues.

In another embodiment, the data entry includes incorrect business logic. For example, a data entry includes a loan balance that has value above zero. However, another value of the data entry indicates that the loan is closed. Loan accounts generally should not be closed while they still have a balance, thus, the entry does not comply with business rules or logic. When the examples provided herein execute rules checking for this type of issue, an alert may be generated that indicates the user account with the discrepancy. The issue can then be addressed.

For example, the example embodiments of the present disclosure may determine that a check for the final balance is in the mail or has not cleared, yet. Accordingly, the rule can be adjusted to accommodate for a delay in a check clearing an associated financial institution. In addition, the examples herein can track versions of the rules as they are adjusted over time. These versions can be used to track exceptions that occurred when the rules were executed and analyze progression of the output of the rules as they progress through the versions.

The progressions can be shown in a trend analysis of a generated report. The trends show outputs, which include rule failures. The output of the trend analysis includes concatenated values that are deconstructed to define the trend. Through this process, an accurate report is generated and provided to indicate the performance of the rules.

The present disclosure also provides for tracking versions of rules and categorizing rules. Different rules are classified into different categories based on the requirements that the rule accomplish when executed on the data. For example, different categories of rules can be executed based on when new data is received.

Figure 1:
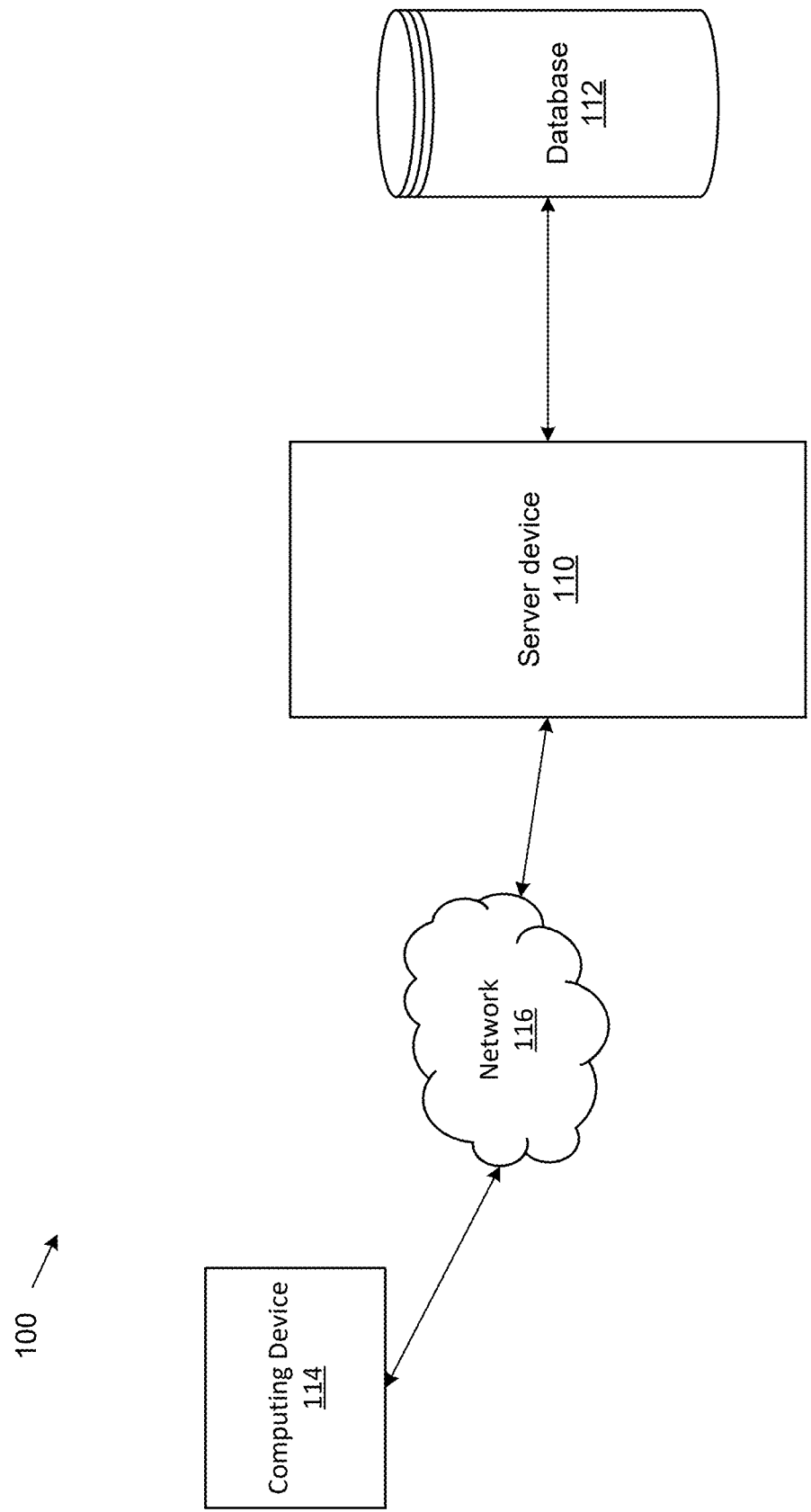
FIG. 1 shows an example system for managing data quality rules.

FIG. 1 schematically shows aspects of one example system 100 for managing data quality rules. The system 100 includes a server device 110 and a database 112. A computing device 114 connects through a network 116 to the server device 110.

Each of the devices may be implemented as one or more computing devices with at least one processor and memory. Example computing devices include a mobile computer, a desktop computer, a server computer, or other computing device or devices such as a server farm or cloud computing used to generate or receive data.

The system 100 may be owned by a financial institution, and the server device 110 is configured to communicate with other client devices. For example, the computing device 114 can be programmed to communicate with the server device 110 to perform various tasks, such as financial transactions.

Many other configurations are possible, and the disclosure is not limited to the financial industry.

In this embodiment, the system 100 is configured to manage data quality rules for analyzing and supporting data. The server device 110 may include one or more rules that can be executed periodically on data within the database 112. In some embodiments, the server device 110 receives input indicating a schedule for executing the specified data quality rules. Further, the server device 110 can schedule data quality rules for execution on a specified schedule. The server device 110 provides additional support functions such as categorizing rules and rule version management. In some embodiments, the server device 110 stores the outputs of executing the rules on the data within the database 112. In addition, the server device 110 categorizes rules for efficient execution, such as based on reception of data.

In some embodiments, the server device 110 connects to other devices, such as the computing device 114. Through these connections, other computing devices can send requirements specifying that selected data quality rules are to be executed. For example, certain entities may require the managing owner of the system 100 to run specific rules for the stored data for compliance purposes. The computing device 114 can upload a rule roster to the server device 110. In some embodiments, the rule roster is provided in SQL. In other embodiments, another query language is used.

The server device 110 may also receive data that is stored in the database 112. For example, the computing device 114 may complete a loan transaction. As part of this process, the computing device 114 sends data through a network 116 to the server device 110. The data related to the loan transaction, such as payment dates, loan amount, and duration, is captured by the server device 110 and stored in the database 112.

The database 112 is configured to store provided data. Further, the database 112 is configured to execute the specified rules from the server device 110. The database 112 may receive requests to execute specified rules from the server device 110. In some embodiments, the database 112 stores the output of the executed rules within the database 112, while in other embodiments, the output is sent to the server device 110. In some embodiments, the database 112 is a relational database that stores data in a format accessible by SQL queries. In other embodiments, the database is a non-relational database.

Figure 2:
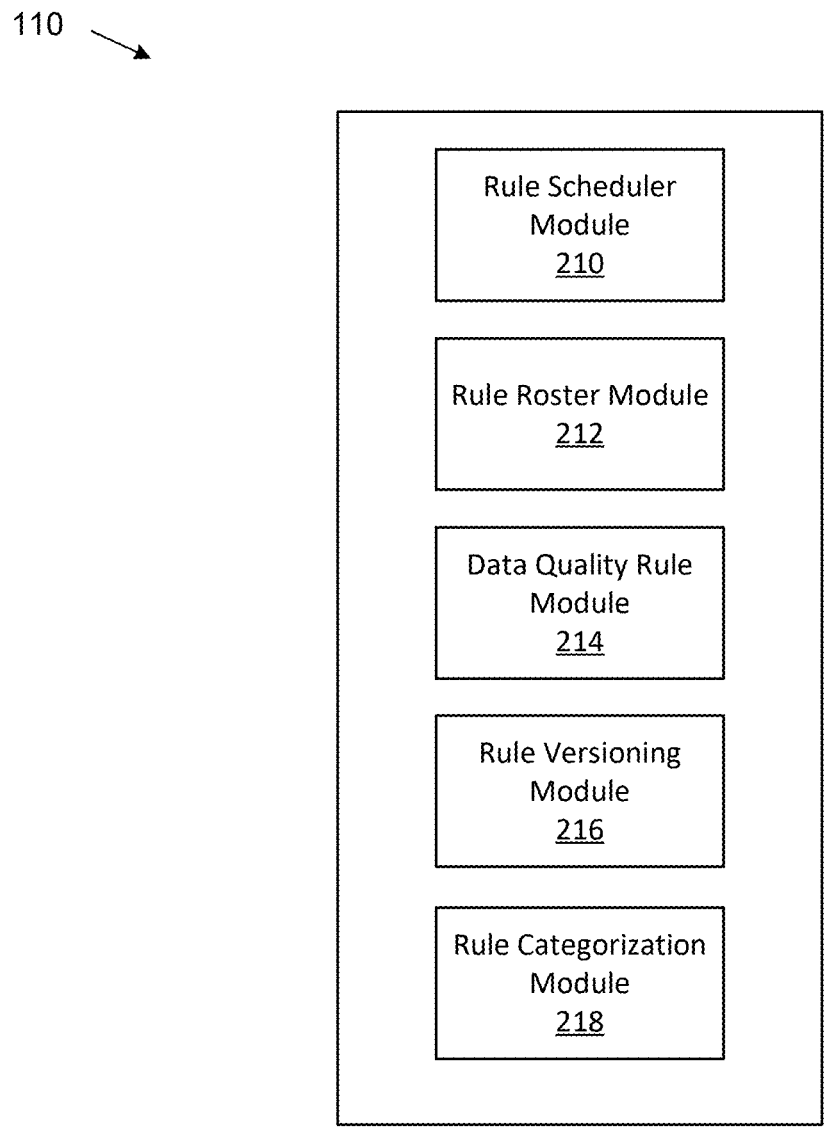
FIG. 2 shows components of a server device of the system of FIG. 1.

FIG. 2 indicates components of the server device 110. In this embodiment, the server device 110 includes a rule scheduler module 210, a rule roster module 212, a data quality rule module 214, a rule versioning module 216, and a rule categorization module 218.

The rule scheduler module 210 is programmed to schedule data quality rules for execution by the data quality rule module 214. These data quality rules can be scheduled to run at regular intervals or triggered by specific events or changes in the data within the database 112. Scheduled triggers can, thus, be a specific event that occurs such as a scheduled period of time or a detection of a specified event. When scheduled for execution, data quality rules then perform their specified function.

In one embodiment, the data quality rules are scheduled to execute at regular intervals. The data quality rules may be scheduled to run daily, weekly, monthly, or at another specified interval. Once the specified interval of time passes, one or more data quality rules can be triggered to execute. In some embodiments, the server device 110 may receive input that causes the rule scheduler module 210 to manually trigger execution of the data quality rules.

The rule scheduler module 210 may also be programmed to schedule data quality rules according to specified triggers. For example, the rule scheduler module 210 can schedule execution of the data quality rules based on data ingestion. When new data is ingested into a system, data rules can be triggered to check the quality, consistency, and validity of the incoming data in some embodiments. Other examples include scheduling rules based on updates to the data within the database 112. If there are updates or changes made to existing data, data quality rules can be triggered to ensure that the updated data still adheres to the data quality rules.

In some embodiments, the rule scheduler module 210 schedules rules when the data exceeds a predetermined threshold. For example, if the data grows beyond a predetermined threshold amount of data, then the data quality rule executes. In additional embodiments, the rule scheduler module 210 may set as a trigger a change to the server device 110 or the database 112. For example, creation of an additional database may trigger the data quality rule.

In some embodiments, the rule scheduler module 210 is also programmed to provide the rules to be executed. For example, the rule scheduler module 210 may receive input that creates a specified rule, and that rule is then provided to the data quality rule module 214. In some embodiments, each created rule is then associated with a specified schedule or trigger.

The rule roster module 212 is programmed to receive rosters and specify which data quality rules are to be executed. The rule roster module 212 includes one or more data quality rules that are to be executed by the data quality rule module 214. The database 112 stores data repositories for many different entities that require different rules to be executed. For example, the computing device 114 may be associated with a particular entity that requires specific rules to be executed on the entity's data. Continuing the example, the computing device 114 is configured to upload a roster with one or more rules for maintaining data quality standards specified by the entity associated with the computing device 114.

In some embodiments, the roster is a document with a list of new or updated rules that are ingested into the data quality rule module 214. The rule roster module 212 receives the roster and stores the data quality rules within the roster. Accordingly, the document can be prepared by users to input new and updated rules for the data quality rule module 214 to execute on specified data. In some embodiments, the rule roster module 212 extracts metadata from a received roster and reads an included rule table to determine which data quality rules are to be executed.

In some embodiments, the data quality rules are expressed in SQL within the rule roster module 212. The rule roster module 212 communicates received rosters to the database 112 for storage and future execution. In some embodiments, the rule roster module 212 receives rule rosters from external entities that require specific rules to be executed on their data set. Expressed rules that are selected by the external entity for execution may be determined from metadata associated with external entities. The rule roster module 212 may receive the roster from the computing device 114.

The data quality rule module 214 stores, manages, and executes the data quality rules. In some embodiments, the server device 110 is remote from the database 112. The data quality rule module 214 then sends requests to execute the data rules to an external system that includes the database 112. In some embodiments, the request includes the data quality rules that are to be ran. The data quality rule module 214 also executes the data quality rules responsive to the rule scheduler module 210 triggering the data quality rule module 214. As previously discussed, triggering the data quality rule module 214 to execute one or more data quality rules can be based on a schedule time or defined trigger. The data quality rule module 214 also receives output from the database 112 based on the executed data quality rules. The output is then stored. In some embodiments, the data quality rule module 214 stores the rule output within a local repository of the server device 110.

In some embodiments, the data quality rule module 214 sends the one or more data quality rules to the database 112 for storage. The data quality rule module 214 sends the request to the external system including the database 112, and the output from executing the data quality rules is stored within the database 112.

The rule versioning module 216 tracks versions of the data quality rules stored within the data quality rule module 214. For example, a rule may be updated over time. As the rule changes, different versions of the data quality rule are recorded. Each version may include an author of the rule, the associated logic of the rule, the effective date of the version, the end date of the version, and an indicator of the current version. In addition, the version of each rule may record the output of that version of the rule, the data quality rule itself, and metadata associated with the rule thus enabling audibility and traceability of the rules as well as output generated by the execution of specific versions of the rules.

In some embodiments, the author may include an entity or business that owns the rule. Further, the metadata associated with the rule may include a number of failures or exceptions recorded by the rule. The recorded output of each version may also include a success rate of the rule and changes made to the rule as compared to a previous version.

The rule versioning module 216 is also configured to generate trend reports and analysis. The trend reports indicate trends in the output of the data quality rules as the rules change between versions. For example, the success rate for a first version may be shown at 90%. The success rate then improves in a subsequent version to 92%. This trend can be shown in the report outputted by the rule versioning module 216. In some embodiments, the rule versioning module 216 generates a report that indicates rule exceptions (i.e., failures) for each version of the rule. Further, the report may include a change to the version of the rule that improved success rate for the rule. That is, the report shows the progression (i.e., trend analysis) of the rule through its various versions of the data quality rule. In some embodiments, the report covers a specified period, such as six months.

In some embodiments, the report concatenates different aspects of the rule. Then, the concatenated values are deconstructed into output. The report including the trend analysis is then built from the deconstructed output. For example, after a rule has executed, the rule versioning module 216 concatenates the output together. If the output is for a loan account, the values concatenated together may include loan pay off date, loan amount, account name, etc. Then the values are deconstructed into individual values for the report.

The rule categorization module 218 is programmed to categorize the data quality rules into categories. The categories may group based on group execution. For example, certain data quality rules may execute based on similar triggers. Thus, these data quality rules can be batched executed at the same time. These data quality rules are grouped into a category for execution.

In other embodiments, the rule categorization module 218 groups rules that are executed on the same or similar schedule. The data quality rules may also be grouped based on author or entity owner of the data quality rules. In some embodiments, the rule categorization module 218 defines categories and groups the data quality into the defined categories. The categories may remain unchanged once defined. In some embodiments, the rules are grouped into the same category based on analyzing similar data sets.

Figure 3:
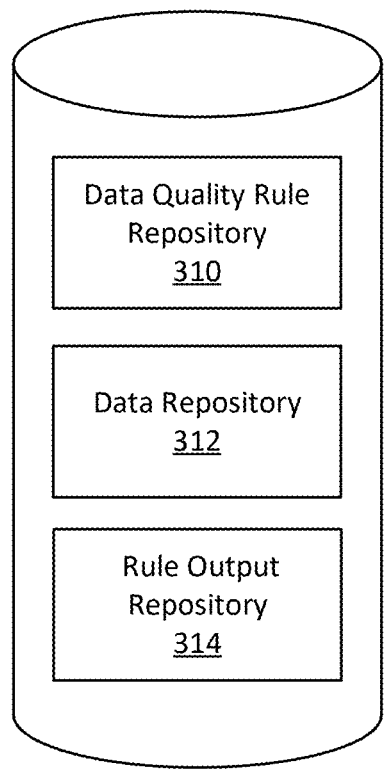
FIG. 3 shows components of a database of the system of FIG. 1.

FIG. 3 indicates components of the database 112. The database 112 includes a data quality rule repository 310, a data repository 312, and a rule output repository 314.

The data quality rule repository 310 stores the received data quality rules. The data quality rules are received from the data quality rule module 214. In some embodiments, the database 112 is remote from the server device 110. A local component, as explained in association with FIG. 4, then executes the data quality rules stored in the data quality rule repository 310.

The data repository 312 stores data for the system 100. For example, the data within the data repository 312 may be loan data, user account data, financial data, or any other kind of data. The data stored within the data repository 312 may be stored in a certain format. For example, the data repository 312 may store the data in a relational format or a non-relational format. In addition, the data repository 312 is configured to allow the data quality rules to execute and evaluate the stored data.

The rule output repository 314 stores output from executing the rules. After one or more data quality rules are executed, the output is stored within the rule output repository 314. In some embodiments, the output is accessible at a future time such as by the external system.

In some embodiments, the database 112 does not include the data quality rule repository 310 or the rule output repository 314. Instead, the data quality rules and output from execution of the rules are stored within the server device 110, such as in the data quality rule module 214.

Figure 4:
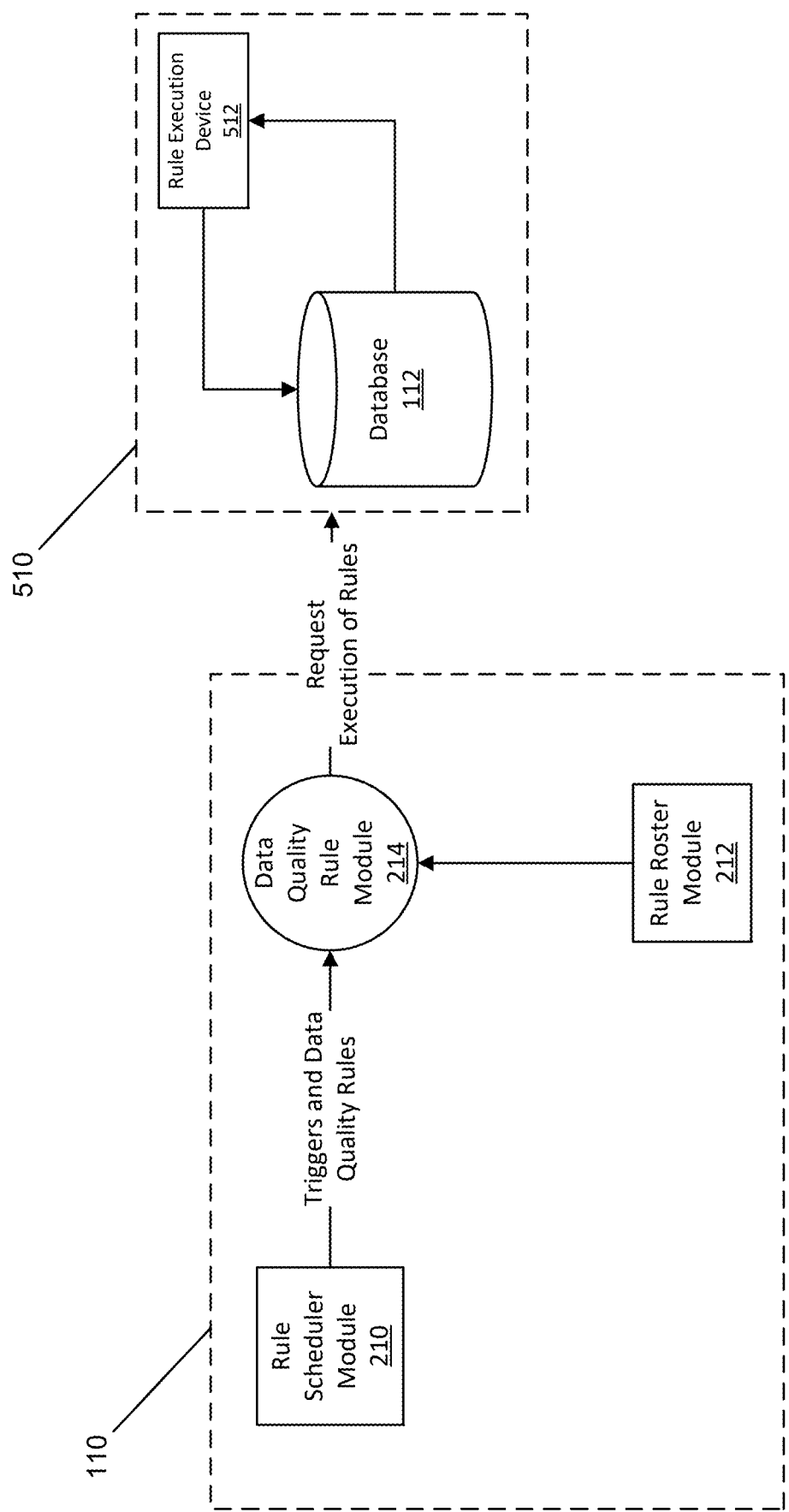
FIG. 4 illustrates an example embodiment of the server and database of FIG. 1 implementing a local pattern for rule execution.

FIG. 4 an example embodiment of the server device 110 and the database 112 implementing a local pattern for rule execution. In this embodiment, the server device 110 is remote from the database 112. An external system 510 includes the database 112 and a rule execution device 512.

In this embodiment, the data quality rules are locally executed. The data quality rules and the output from the execution of the rules are also locally stored within the database 112. Further, the output from executing the rules is locally stored within the rule output repository 314. The shown local pattern is designed to process larger datasets by removing the need to transfer output of rules to a remote system.

The rule scheduler module 210 loads triggers for data quality rules to the data quality rule module 214. In some embodiments, the rule scheduler module 210 may load certain data quality rules. In some embodiments, the rule roster module 212 sends a rule roster that specifies selected rules that are to be executed by the server device 110. The data quality rule module 214 receives the triggers and data quality rules. Further, the data quality rule module 214 also receives the rule roster from the rule roster module 212 in some embodiments. After reception, the data quality rule module 214 requests execution of selected data quality rules to the external system 510.

The database 112 includes the data quality rule repository 310 for storing the data quality rules received from the data quality rule module 214. The external system 510 includes the rule execution device 512 which is configured to execute the locally stored rules. Once the external system 510 receives the request for execution of the data quality rules, the rule execution device 512 executes the rules by performing the specified functions of the rules on the locally stored data within the data repository 312. The output from executing the rules is locally stored within the rule output repository 314.

Figure 5:
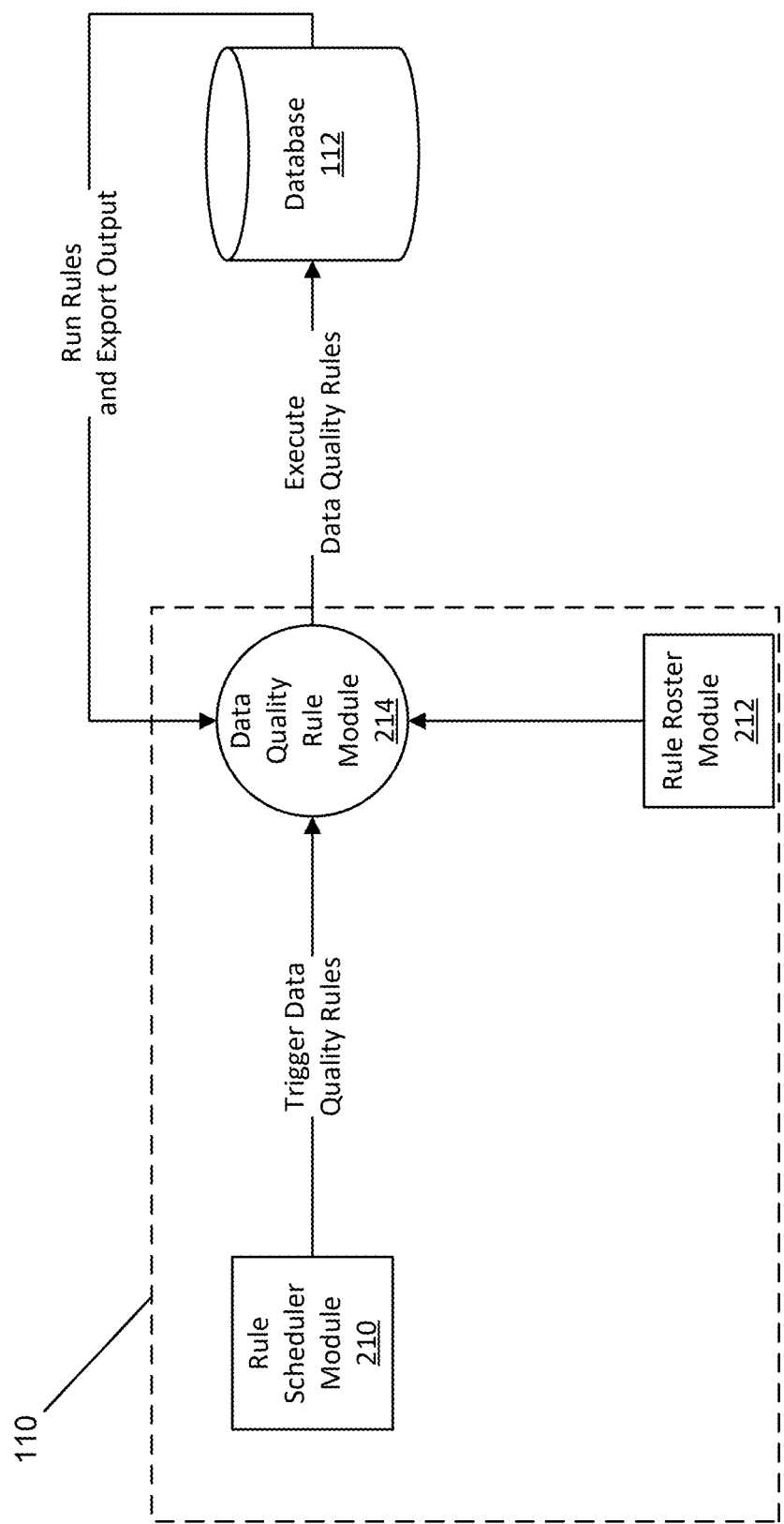
FIG. 5 illustrates an example embodiment of the server and database of FIG. 1 implementing a centralized pattern for rule execution.

FIG. 5 illustrates an example embodiment of the server device 110 and the database 112 implementing a centralized pattern for rule execution. In this embodiment, the rule scheduler module 210 and the rule roster module 212 perform the same or similar functions. The data quality rule module 214 executes the specified rules on the data within the data repository 312. The data quality rule module 214 performs the specified functions associated with the rules. The output from executing the rules is then stored within the data quality rule module 214.

In some embodiments, the output is stored at an external system not shown. The centralized pattern may be designed to process smaller datasets. In some embodiments, systems that use the centralized pattern may have less flexibility of deploying new repository tables and rule execution jobs. The output from executing the data quality rules and the data quality rules themselves are centrally stored within the server device 110.

Figure 6:
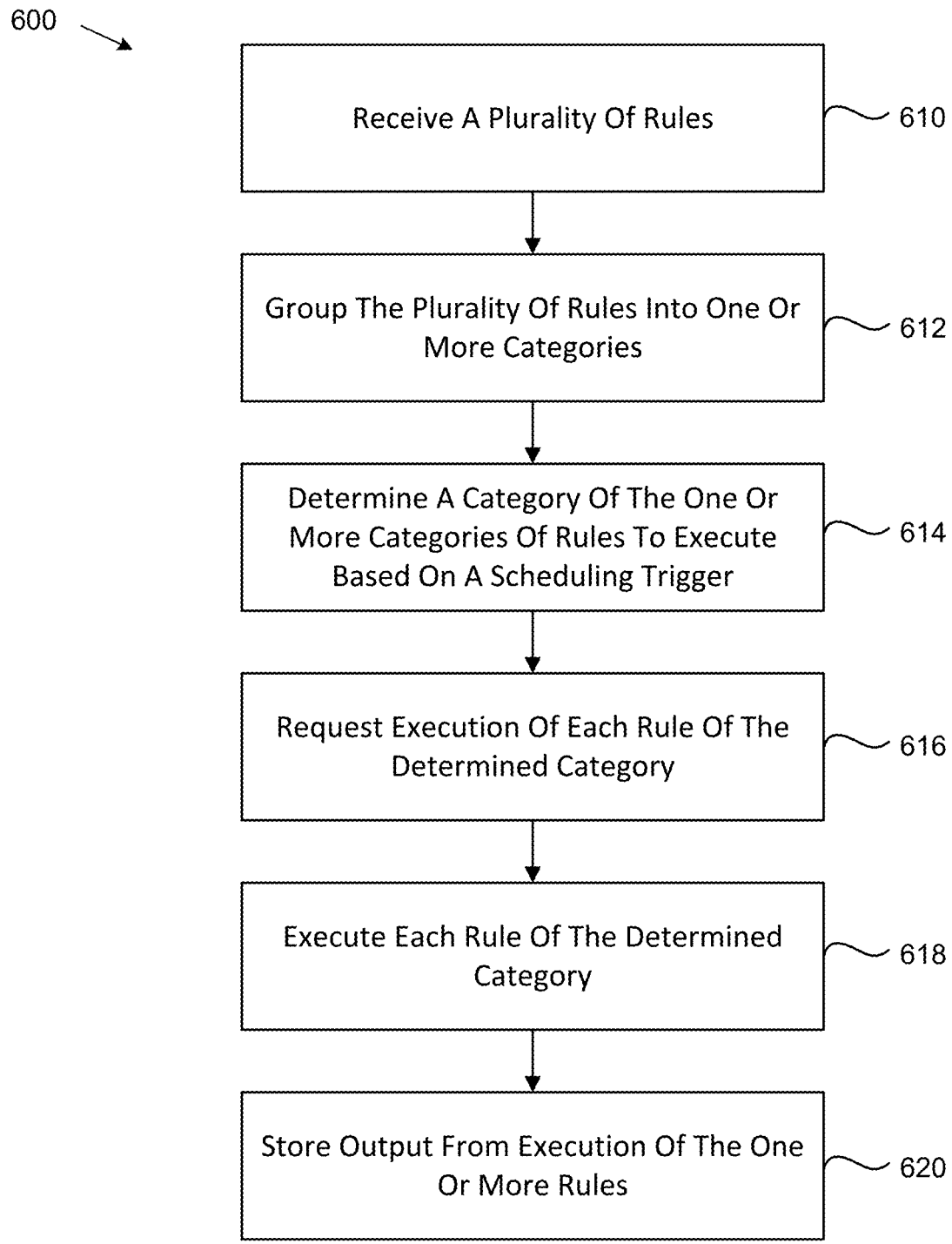
FIG. 6 illustrates an example method for executing one or more data quality rules using the system of FIG. 1.
Figure 7:
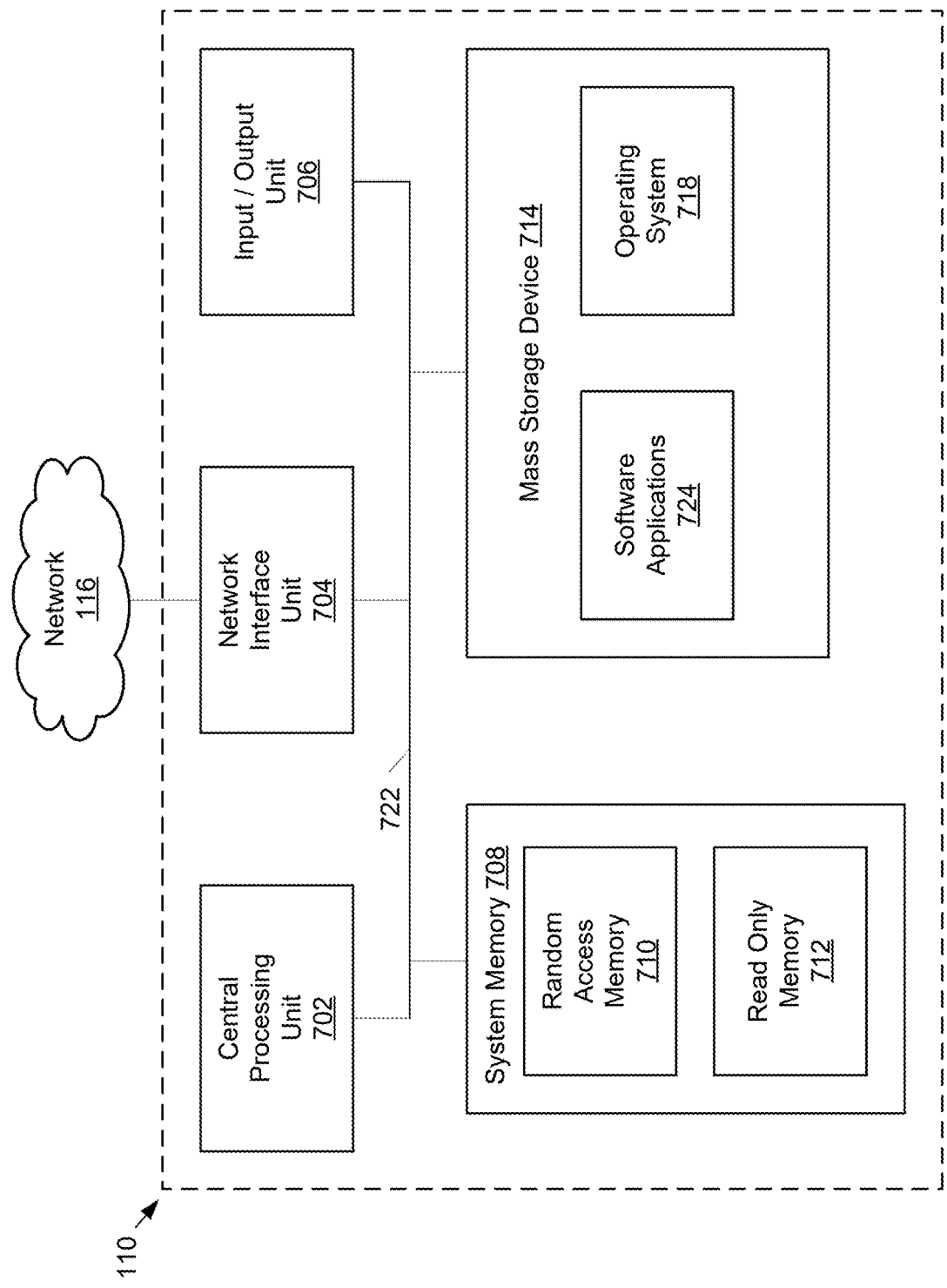
FIG. 7 shows example physical components of the server device of FIG. 1.

FIG. 6 illustrates an example method for executing one or more data quality rules using the system 100. The method 600 includes an operation 610, an operation 612, an operation 614, an operation 616, an operation 618, and an operation 620. Some or all of the operation 610, the operation 612, the operation 614, the operation 616, the operation 618, and the operation 620 may be performed by the system 100, the server device 110, or the database 112. In some embodiments, the method 600 is stored as instructions in a non-transitory memory.

Beginning at operation 610, a plurality of data quality rules is received. The plurality of data quality rules may be received by the server device 110. Further, the plurality of rules may be received as input. In some embodiments, an external device provides the data quality rules to the server device 110. For example, a rule requiring a loan balance to be zero before closing the account is uploaded to the server device 110.

Proceeding to operation 612, the plurality of rules is grouped into one or more groups. Each of the data quality rules of the plurality of rules is put into a group. The groups may be based on each rule sharing a scheduling trigger. Continuing the example, the loan balance rule is triggered to run every week. The loan balance rule is then grouped with other rules that run weekly.

At operation 614, one or more categories of the grouped categories to execute is determined based on a scheduling trigger. In some embodiments, the server device 110 makes the determination. In the previous example, the server device 110 determines to execute the category including the loan balance rule because the weekly designated time has occurred.

Proceeding to operation 616, execution of each rule of the determined categories is requested. The server device 110 may execute the rules of the selected category. The operation 616 may further include performing specified functions of the rule. In some embodiments, the server device 110 sends a request to the external system 510 to execute the loan balance rule.

At operation 618, the one or more rules are executed. The external system 510 may execute the loan balance rule. In addition, the execution may determine that an account has a nonzero balance but its marked as closed. This causes that account to be marked as an exception (or failure) for the data quality rule.

At operation 620, output from execution of the one or more rules is stored. In some embodiments, the output is stored in the database 112. In other embodiments, the output is stored in the server device 110. Continuing the previous example, the account with a nonzero loan balance marked as closed is stored as an exception.

In some embodiments, the method 600 further includes receiving an update to a rule and generating a new version of the rule based on the input. Different versions of the rules can thus be created and tracked. For example, the previously discussed rule may be updated to a new version that accounts for a three-day hold period for a check to clear. Thus, when executed, the rule does not mark an account as an exception if the balance was paid off in the last three days.

In further embodiments, the method 600 may include generating a trend report. The trend report may indicate trends of outputs of the rule over time and different versions of the rule. For example, success rate and failure rate for different versions of a data quality rule may be included within the trend report.

As illustrated in the embodiment of FIG. 4, the example server device 110, which provides the functionality described herein, can include at least one central processing unit ("CPU") 702, a system memory 708, and a system bus 722 that couples the system memory 708 to the CPU 702. The system memory 708 includes a random-access memory ("RAM") 710 and a read-only memory ("ROM") 712. A basic input/output system containing the basic routines that help transfer information between elements within the server device 110, such as during startup, is stored in the ROM 712. The server device 102 further includes a mass storage device 714. The mass storage device 714 can store software instructions and data. A central processing unit, system memory, and mass storage device similar to that shown can also be included in the other computing devices disclosed herein.

The mass storage device 714 is connected to the CPU 702 through a mass storage controller (not shown) connected to the system bus 722. The mass storage device 714 and its associated computer-readable data storage media provide non-volatile, non-transitory storage for the server device 110. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 110.

According to various embodiments of the invention, the server device 110 may operate in a networked environment using logical connections to remote network devices through network 116, such as a wireless network, the Internet, or another type of network. The server device 110 may connect to network 116 through a network interface unit 704 connected to the system bus 722. It should be appreciated that the network interface unit 704 may also be utilized to connect to other types of networks and remote computing systems. The server device 110 also includes an input/output controller 706 for receiving and processing input from a number of other devices, including a touch user interface display screen or another type of input device. Similarly, the input/output controller 706 may provide output to a touch user interface display screen or other output devices.

As mentioned briefly above, the mass storage device 714 and the RAM 710 of the server device 110 can store software instructions and data. The software instructions include an operating system 718 suitable for controlling the operation of the server device 110. The mass storage device 714 and/or the RAM 710 also store software instructions and applications 724, that when executed by the CPU 702, cause the server device 110 to provide the functionality of the server device 110 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for executing data quality rules, the computer system comprising:
   one or more processors; and
   non-transitory computer-readable storage media encoding instructions which, when executed by the one or more processors, causes the computer system to:
   receive a plurality of rules;
   group the plurality of rules into one or more categories of rules;
   determine a category of the one or more categories of rules to execute based on a scheduling trigger;
   request execution of each rule of the category by a database;
   receive, from the database, output from execution of the each rule of the category;
   concatenate values from the output to form concatenated values;
   deconstruct the concatenated values to generate a trend report indicating success rates across versions of the plurality of rules;
   generate a new version of at least one rule of the plurality of rules; and
   automatically adjust the new version of the at least one rule based on the trend report.

2. The computer system of claim 1, wherein the trend report includes a success rate and a failure rate of each version of the plurality of rules.

3. The computer system of claim 1, wherein the scheduling trigger is a period of time.

4. The computer system of claim 1, wherein the scheduling trigger is an occurrence of an event.

5. The computer system of claim 4, wherein the event is a reception of additional data.

6. The computer system of claim 1, comprising further instructions which, when executed by the one or more processors, causes the computer system to schedule the execution of the one or more categories of rules.

7. The computer system of claim 1, wherein the plurality of rules is grouped into the one or more categories of rules further based on executing on a same data set.

8. The computer system of claim 1, comprising further instructions which, when executed by the one or more processors, causes the computer system to receive a rule roster that include specified rules that are to be executed.

9. A method for executing data quality rules, the method comprising:
   receiving a plurality of rules;
   grouping the plurality of rules into one or more categories of rules;
   determining a category of the one or more categories of rules to execute based on a scheduling trigger;
   requesting execution of each rule of the category by a database;
   storing output from execution of each rule of the category;
   concatenating values from the output to form concatenated values;
   deconstructing the concatenated values to generate a trend report indicating success rates across versions of the plurality of rules;
   generating a new version of at least one rule of the plurality of rules; and
   automatically adjusting the new version of the at least one rule based on the trend report.

10. The method of claim 9, wherein the output is stored in the database.

11. The method of claim 9, wherein the output is stored in a device external to the database.

12. The method of claim 9, wherein the trend report includes a success rate and a failure rate of each version of the plurality of versions of the rules.

13. The method of claim 9, wherein the scheduling trigger is a period of time.

14. The method of claim 9, wherein the scheduling trigger is an occurrence of an event.

15. The method of claim 14, wherein the event is a reception of additional data.

16. The method of claim 9, further comprising scheduling execution of the one or more categories of rules.

* * * * *

UNITED STATES PATENT AND TRADEMARK OFFICE
CERTIFICATE OF CORRECTION

PATENT NO. : 12,411,895 B1
APPLICATION NO. : 18/776070
DATED : September 9, 2025
INVENTOR(S) : Pondicherry et al.

Page 1 of 1

It is certified that error appears in the above-identified patent and that said Letters Patent is hereby corrected as shown below:

In the Claims

Column 10, Line 45, Claim 12: delete "versions of the".

Signed and Sealed this
Twenty-eighth Day of October, 2025

John A. Squires
*Director of the United States Patent and Trademark Office*